US012764822B2

(12) United States Patent
Lauridsen et al.

(10) Patent No.: US 12,764,822 B2
(45) Date of Patent: Oct. 13, 2026

(54) METHOD FOR CONTROLLING SYSTEM INFORMATION DELIVERY

(71) Applicant: Nokia Technologies Oy, Espoo (FI)

(72) Inventors: Mads Lauridsen, Gistrup (DK); Jussi-Pekka Koskinen, Oulu (FI); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 333 days.

(21) Appl. No.: 18/703,306

(22) PCT Filed: Oct. 14, 2022

(86) PCT No.: PCT/FI2022/050690
§ 371 (c)(1),
(2) Date: Apr. 19, 2024

(87) PCT Pub. No.: WO2023/067244
PCT Pub. Date: Apr. 27, 2023

(65) Prior Publication Data

US 2024/0422856 A1 Dec. 19, 2024

(30) Foreign Application Priority Data

Oct. 20, 2021 (FI) ...................................... 20216079

(51) Int. Cl.
*H04W 76/27* (2018.01)
*H04W 64/00* (2009.01)

(52) U.S. Cl.
CPC ......... *H04W 76/27* (2018.02); *H04W 64/003* (2013.01)

(58) Field of Classification Search
CPC ... H04W 76/27; H04W 64/003; H04W 48/02; H04W 48/14
See application file for complete search history.

(56) References Cited

U.S. PATENT DOCUMENTS

2022/0279425 A1* 9/2022 Shreevastav .......... H04W 48/06
2022/0353944 A1* 11/2022 Shih .................... H04W 72/231
2024/0244509 A1* 7/2024 Wu .................... H04B 7/15528

* cited by examiner

*Primary Examiner* — Justin T Van Roie
(74) *Attorney, Agent, or Firm* — Barta Jones, PLLC

(57) ABSTRACT

A method comprising: providing a user equipment (UE) with one or more restrictions, in addition to a timer, for limiting the UE to send on-demand System Information Block (SIB) requests regarding reference signal configurations for Radio Resource Control (RRC) Idle/Inactive UE mode; receiving an on-demand SIB request regarding reference signal configurations for RRC Idle/Inactive UE from the user equipment; and sending a reference signal configuration SIB to the user equipment.

20 Claims, 3 Drawing Sheets

METHOD FOR CONTROLLING SYSTEM INFORMATION DELIVERY

TECHNICAL FIELD

The present invention relates to controlling on-demand System information delivery.

BACKGROUND

System information (SI) for user equipment (UE) in 4G/LTE and 5G NR networks comprises basic system information within a Master Information Block (MIB) broadcast on Physical Broadcast Channel (PBCH) periodically and various scheduling and cell access information within a set of System Information Blocks (SIBs) broadcast on Physical Downlink Shared Channel (PDSCH) also periodically.

The 5G NR system introduces a new approach for SI transmission called on-demand SI delivery. In NR, MIB and SIB1 are defined as minimum SI while the other SIBs (SIB2, SIB3, . . . ) are defined as other SI. The other SI comprises additional information and may be delivered when needed, i.e. as on-demand basis. When the UE sends an on-demand SIB request, it keeps monitoring the SI windows of the broadcast period to receive the SIB.

When the UE is in RRC Idle/Inactive mode and it is controlled to transfer to RRC Connected mode, it must acquire System Information (SI) to access the network. For providing the UEs in RRC Idle/Inactive mode with more synchronization opportunities to transfer to RRC Connected mode, a specific SIB could be used to broadcast TRS/CSI-RS configurations for UEs in RRC Idle/Inactive mode. However, if implemented as on-demand SIB, the UE may request on-demand SIBs with TRS/CSI-RS information rather frequently, for example as a default operation. Nevertheless, a SIB with TRS/CSI-RS information may be assumed to be rather large and too frequent on-demand SIB requests may lead to unnecessarily large signaling overhead.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising means for receiving an on-demand System Information Block (SIB) request regarding reference signal configurations from a user equipment (UE) in Radio Resource Control (RRC) Idle/Inactive mode; and means for sending a reference signal configuration SIB to the user equipment provided with one or more restrictions, in addition to a timer, for limiting the user equipment to send on-demand SIB requests regarding reference signal configurations for RRC Idle/Inactive UE.

According to an embodiment, the apparatus comprises: means for sending said one or more restrictions to the user equipment.

According to a second aspect, there is provided an apparatus comprising: means for storing one or more restrictions, in addition to a timer, for limiting a user equipment (UE) to send on-demand System Information Block (SIB) requests regarding reference signal configurations for Radio Resource Control (RRC) Idle/Inactive UE mode; means for checking that said one or more restrictions are fulfilled; means for sending an on-demand SIB request regarding reference signal configurations for RRC Idle/Inactive UE mode to a network element; and means for receiving a reference signal configuration SIB from the network element.

According to an embodiment, said reference signal is a Tracking Reference Signal/Channel State Information Reference Signal (TRS/CSI-RS).

According to an embodiment, said one or more restrictions comprise a threshold time for the user equipment to be associated with at least one cell or beam before allowing to send said on-demand SIB request.

According to an embodiment, threshold time for the user equipment comprises a dynamically changing group of beams to be attached to, said group of beams being used for cell measurement operations, wherein said threshold time is associated with at least one unchanged beam.

According to an embodiment, said one or more restrictions comprise a maximum number of cell reselections or beam switches within a predetermined period for being allowed to send said on-demand SIB request.

According to an embodiment, said one or more restrictions comprise a minimum time for the user equipment estimated to remain associated with said at least one cell or beam.

According to an embodiment, said one or more restrictions comprise a maximum threshold value for a mobility of the user equipment, wherein said maximum threshold value for the mobility of the UE is defined based on a mobility state of the UE.

According to an embodiment, said one or more restrictions comprise a maximum variation in reference signal received power (RSRP) value.

According to an embodiment, said one or more restrictions comprise a minimum threshold for reference signal received power (RSRP) value.

According to an embodiment, said one or more restrictions comprise a predetermined location information for the user equipment.

According to an embodiment, said one or more restrictions comprise a threshold value for a probability of the user equipment being paged.

According to an embodiment, said one or more restrictions comprise a minimum time for the user equipment having been in RRC Idle or Inactive state or an estimate to remain in RRC Idle or Inactive state.

A method according to a third aspect comprises: providing a user equipment (UE) with one or more restrictions, in addition to a timer, for limiting the UE to send on-demand System Information Block (SIB) requests regarding reference signal configurations for Radio Resource Control (RRC) Idle/Inactive UE mode; receiving an on-demand SIB request regarding reference signal configurations for RRC Idle/Inactive UE from the user equipment; and sending a reference signal configuration SIB to the user equipment.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

The following describes in further detail suitable apparatus and possible mechanisms carrying out the operations for controlling on-demand System information delivery. While the following focuses on 5G networks, the embodiments as described further below are by no means limited to be implemented in said networks only, but they are applicable in any network and protocol entities supporting on-demand System information delivery.

Figure 1:
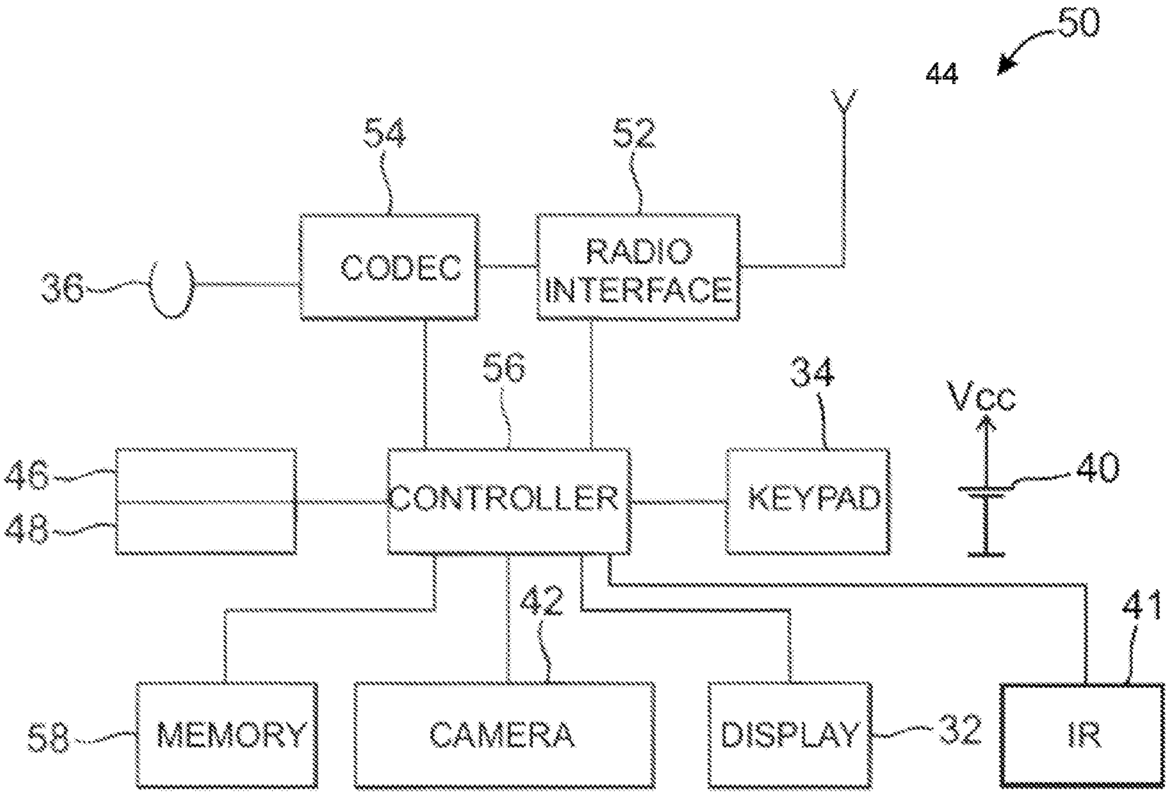
FIG. 1 shows a schematic block diagram of an apparatus for incorporating functionalities for implementing various embodiments.
Figure 2:
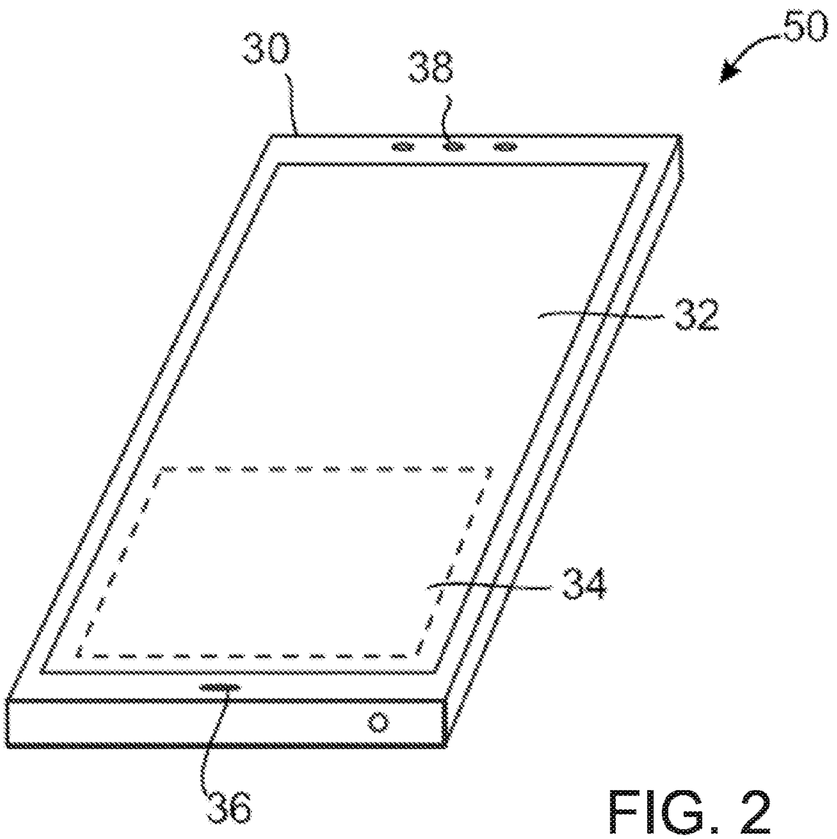
FIG. 2 shows schematically a layout of an apparatus according to an example embodiment.

In this regard, reference is first made to FIGS. 1 and 2, where FIG. 1 shows a schematic block diagram of an exemplary apparatus or electronic device 50, which may incorporate the arrangement according to the embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
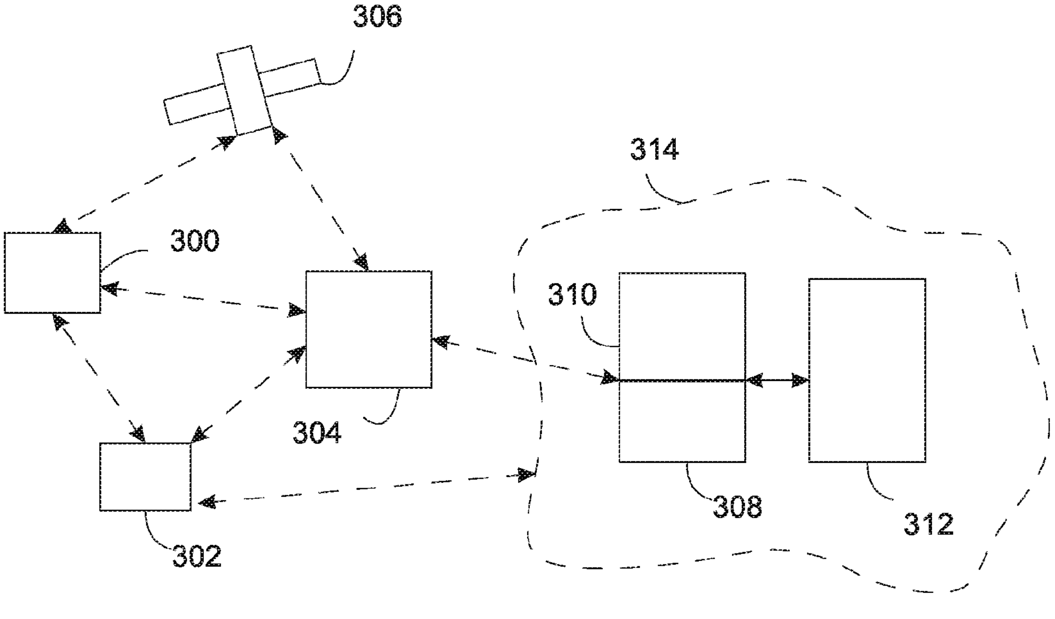
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g) NodeB) 304 providing the cell. The physical link from a user device to a (e/g) NodeB is called uplink or reverse link and the physical link from the (e/g) NodeB to the user device is called downlink or forward link. It should be appreciated that (e/g) NodeBs or their functionalities may be implemented by using any node (such as Integrated Access and Backhaul (IAB) node), host, server or access point etc. entity suitable for such a usage.

A communication system typically comprises more than one (e/g) NodeB in which case the (e/g) NodeBs may also be configured to communicate with one another over links, wired or wireless, designed for the purpose. These links may be used for signaling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to user devices. The antenna unit may comprise a plurality of antennas or antenna elements. The (e/g) NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

In 5G NR, the User Plane Function (UPF) may be used to separate the control plane and the user plane functions. Therein, the Packet Gateway (PGW) control and user plane functions may be decoupled, whereby the data forwarding component (PGW-U) may be decentralized, while the PGW-related signaling (PGW-C) remains in the core. This allows packet processing and traffic aggregation to be performed closer to the network edge, increasing bandwidth efficiencies while reducing network.

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g) Node Bs, includes, in addition to Home (e/g) NodeBs (H (e/g) nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical Broadcast Channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

The transitions between the states are controlled by a state machine of the RRC. When the UE is powered up, it is in a Disconnected mode/Idle mode. The UE may transit to RRC Connected mode with an initial attach or with a connection establishment. If there is no activity from the UE for a short time, eNB/gNB may suspend its session by moving to RRC Inactive mode and can resume its session by moving to RRC Connected mode. The UE can move to the RRC Idle mode from the RRC Connected mode or from the RRC Inactive mode.

When the UE is in RRC Connected mode, it must periodically perform beam management related operations, such as tracking reference signal/channel state information reference signals (TRS/CSI-RS) measurements, synchronization signal blocks (SSB) measurements, as well as to report periodically the result of these measurements to the network.

When the UE is in RRC Idle/Inactive mode and it is controlled to transfer to RRC Connected mode, it must acquire System Information (SI) to access the network. The System information (SI) for UEs comprises the Master Information Block (MIB) and a set of System Information Blocks (SIBs). The MIB comprises the basic system information and it is broadcast on PBCH periodically. The SIBs, in turn, comprise various scheduling and cell access information broadcast on PDSCH.

The 5G NR system introduces a new approach for SI transmission called on-demand SI delivery. In NR, MIB and SIB1 are defined as minimum SI while the other SIBs (SIB2, SIB3, . . . ) are defined as other SI. Minimum SI provides the basic information on acquiring other SI and processing initial access. Minimum SI is broadcast periodically in the SI window, and the UEs monitor the SI window of the broadcast period for obtaining the SI.

The other SI comprises additional information and may be delivered when needed, i.e. as on-demand basis. When the UE sends an on-demand SIB request, it keeps monitoring the SI windows of the broadcast period to receive the SIB. The access node, such as an eNB or a gNB, broadcasts the requested SIB in the SI window when it receives the SIB request.

For providing the UEs in RRC Idle/Inactive mode with more synchronization opportunities to transfer to RRC Connected mode, as well as to monitor for paging, a specific SIB could be used to broadcast TRS/CSI-RS configurations for UEs in RRC Idle/Inactive mode. This is feasible because the network may already be transmitting such reference signals to the RRC Connected UEs. Instead of broadcasting such a rather large SIB periodically without exact information if there is any RRC Idle/Inactive UEs in need of the TRS/CSI-RS configurations, it is more preferable to deliver the information as on-demand SIB.

In the current 3GPP specification, more precisely in TS38.331 Rel-16, the UE is required to start a timer, when requesting one or more on-demand SIBs. In TS38.331, this timer is referred to as T350. Thereafter, the UE is only allowed to request the SIB again when the timer T350 is not running (i.e., it is expired or otherwise stopped).

There are no other limitations on how often and when the UE is allowed to request SIBs in dedicated manner besides those set by the timer. Accordingly, provided that the timer is not running, the UE may request on-demand SIBs with reference signal information, such as TRS/CSI-RS information, rather frequently, for example as a default operation. However, a SIB with reference signal information may be assumed to be rather large and too frequent on-demand SIB requests may lead to unnecessarily large signaling overhead.

Therefore, it would be preferable to have a more accurate control of the UE behaviour for the on-demand SIB requests regarding reference signal configurations for RRC Idle/Inactive UE.

In the following, an enhanced method for limiting the on-demand SIB requests regarding reference signal configurations for RRC Idle/Inactive UE will be described in more detail, in accordance with various embodiments. It is, however, noted that while the on-demand SIB requests regarding reference signal configurations for RRC Idle/Inactive UE are used herein as illustrative examples, the principle underlying the method is equally applicable to any corresponding on-demand SIB request.

Figure 4:
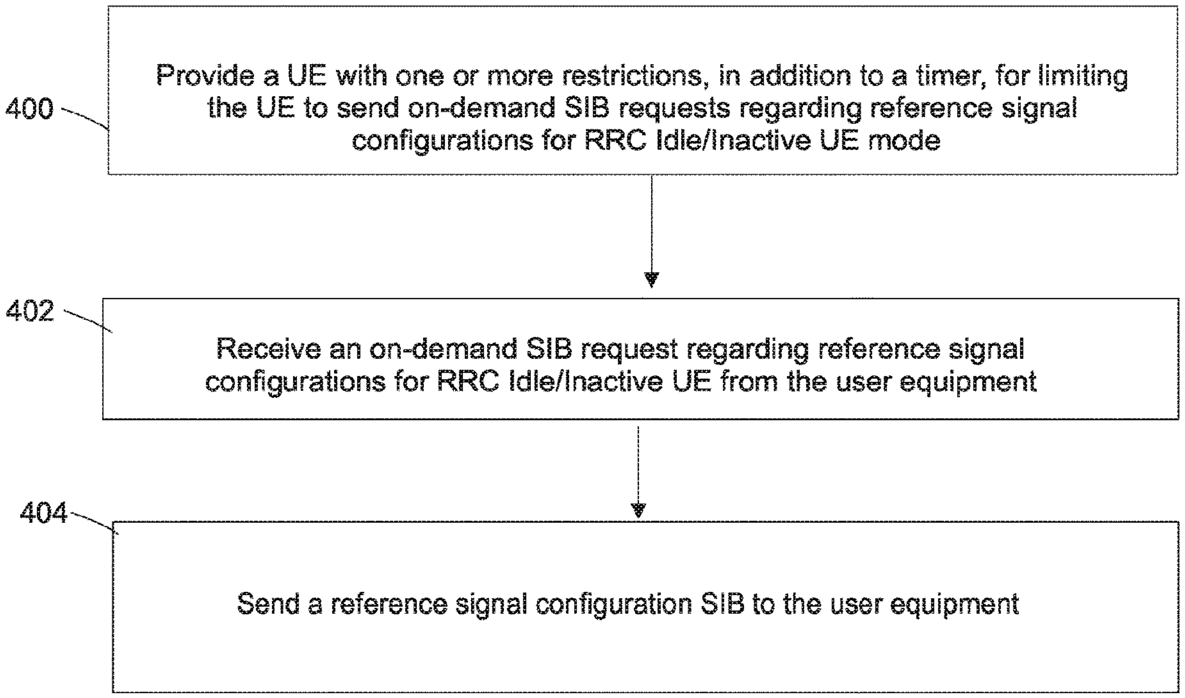
FIG. 4 shows a flow chart for a method for limiting on-demand SIB requests according to an embodiment.

The method is disclosed in flow chart of FIG. 4, wherein the method comprises: providing (400) a user equipment (UE) with one or more restrictions, in addition to a timer, for limiting the UE to send on-demand System Information Block (SIB) requests regarding reference signal configurations for Radio Resource Control (RRC) Idle/Inactive UE; receiving (402), by a network element, an on-demand SIB request regarding reference signal configurations for RRC Idle/Inactive UE from the UE; and sending (404) a reference signal configuration SIB to the UE.

Thus, by providing the UE with one or more restrictions, in addition to the timer, said restrictions limiting the UE to send on-demand SIB requests regarding reference signal configurations, such as TRS/CSI-RS configurations, for RRC Idle/Inactive UE, for example as a default operation in almost automatic fashion, the network is able to reduce the signaling overhead, since the number of potentially large reference signal configuration SIB messages to be sent is reduced.

According to an embodiment, the method comprises sending, by the network element, said one or more restrictions to the user equipment (UE). Thus, the network may be responsible for providing the restrictions to the UE, wherein a network element, for example an eNB or a gNB, may send said restrictions to the UE. As a result, the number and type of restrictions may be network- or sub-network-specific, even cell-specific.

According to an embodiment, said one or more restrictions may be pre-stored in the UE. Thus, the restrictions may be mandatory for the UEs, for example, defined by a standard.

Consequently, the network element may affirm that the UE is provided with said one or more restrictions either explicitly by sending the one or more restrictions to the UE for configuration or implicitly by assuming that the UE operates as defined by the standard, and thus has the one or more restrictions pre-stored in its memory.

Examples of said one or more restrictions are given in the following embodiments. It is noted that the restrictions are not limited to the following embodiments, but any further restrictions may be used, as well. It is also noted that while the on-demand SIB requests regarding TRS/CSI-RS configurations for RRC Idle/Inactive UE are used herein as illustrative examples, the embodiments are equally applicable to any reference signal configurations. As mentioned above, the embodiments are also equally applicable to any corresponding on-demand SIB request.

When aiming to limit potentially unnecessary on-demand SIB requests regarding TRS/CSI-RS configurations for RRC Idle/Inactive UE, one of the sources of such potentially unnecessary on-demand SIB requests are highly mobile devices, which will pass through multiple beams and/or cells in a short time and thus make many requests for beam-specific TRS/CSI-RS configurations. Many of the following embodiments provide various means for addressing this problem.

According to an embodiment, said one or more restrictions comprise a threshold time for the UE to be associated with at least one cell or beam before allowing to send said on-demand SIB request. Accordingly, a minimum time X is set to the UE for camping on a cell(s) (e.g. based on location information or due to the UE having not reselected another cell based on radio measurements) or being configured with a beam(s) before the UE is allowed to send the request for SIB including TRS/CSI-RS configurations for Idle/Inactive UE. Herein, the threshold time may also be linked to a group of cells or beams. The UE being configured with one or more beams may be defined, for example, based on the SSB index of the received beam(s).

According to an embodiment, said threshold time for the UE comprises a dynamically changing group of beams to be attached to, said group of beams being used for cell measurement operations, wherein said threshold time is associated with at least one unchanged beam. Thus, it may be defined that the set of beams that are used for cell measurement quantity, for example as defined in 3GPP TS38.304, cannot change more than a certain amount, e.g. at least one of the beams in the set of beams have to remain same.

According to an embodiment, said one or more restrictions comprise a maximum number of cell reselections or beam switches within a predetermined period for being allowed to send said on-demand SIB request. Hence, the UE may perform said maximum number of cell reselections/beam switches Y within the last Z seconds and still be allowed to send said on-demand SIB request. However, if the maximum number of cell reselections/beam switches within said predetermined period is exceeded, the UE is not allowed to send the request for SIB including TRS/CSI-RS configurations for Idle/Inactive UEs, until the number of cell reselections/beam switches within the last Z seconds is below said maximum number again. Thus, said maximum number of cell reselections/beam switches Y within the last Z seconds defines a maximum threshold value within a sliding window. Alternatively, the UE could be blocked from requesting the SIB for T seconds after detecting that the restriction condition is fulfilled.

According to an embodiment, said maximum number of cell reselections or beam switches is associated with a dynamically changing group of beams being used for cell measurement operations. Herein, it may be defined that the number of beam changes in the set of beams that are used for cell measurement quantity, for example as defined in 3GPP TS38.304, is limited to Y within X seconds.

According to an embodiment, said one or more restrictions comprise a minimum time for the UE estimated to remain associated with said at least one cell or beam. Hence, the UE is allowed to request SIB including TRS/CSI-RS configurations for Idle/Inactive UE in case the expected dwell time of the UE within an area is sufficient; for example, the UE expects to be on the same beam, cell or area (i.e. covering a group of beam/cells), where that SIB is valid, for more than X seconds.

According to an embodiment, said one or more restrictions comprise a maximum threshold value for a mobility of the UE. Thus, the UE is allowed to request SIB including TRS/CSI-RS configurations for Idle/Inactive UE in case a low mobility and/or stationarity condition is met.

According to an embodiment, said threshold value for the mobility of the UE is defined based on a mobility state of the UE. Accordingly, the UE may be allowed to request SIB including TRS/CSI-RS configurations for Idle/Inactive UE when the UE is in a mobility state with a predetermined maximum or a lower value, where the mobility states and state transitions may be defined, for example, as in 3GPP 38.304.

According to an embodiment, said one or more restrictions comprise a maximum variation in reference signal received power (RSRP) value. Thus, the UE may be allowed to request SIB including TRS/CSI-RS configurations for Idle/Inactive UE in case the measured RSRP remains stable i.e. the variation is less than +/−k dB during X seconds. Thus, said maximum variation in RSRP value is defined within a sliding window.

According to an embodiment, said one or more restrictions comprise a minimum threshold for reference signal received power (RSRP) value. Thus, the UE may be allowed to request SIB including TRS/CSI-RS configurations for Idle/Inactive UE in case the measured RSRP is better than said threshold. This restriction enables to prevent the UE to request said SIB, e.g. when the UE is approaching or residing at the cell edge.

In the above embodiments, a reference signal received quality (RSRQ) value may be alternatively used instead of RSRP value.

According to an embodiment, said one or more restrictions comprise a predetermined location information for the UE. Herein, the UE may be allowed to request SIB including TRS/CSI-RS configurations for Idle/Inactive UE, for example, in case the UE determines that it is in its home/work cell/beam location. Such locations can be determined over time by UE (or network)

According to an embodiment, said one or more restrictions comprise a threshold value for a probability of the UE being paged. Thus, the UE may be allowed to request SIB including TRS/CSI-RS configurations for Idle/Inactive UE in case the UE's paging probability does not exceed a threshold P. It is noted that the UE's paging probability may be estimated by the UE and/or the network.

According to an embodiment, said one or more restrictions comprise a minimum time for the UE having been in RRC Idle or Inactive state or an estimate to remain in RRC Idle or Inactive state. Accordingly, the UE is allowed to request SIB including TRS/CSI-RS configurations for Idle/Inactive UE in case it has spent at least X seconds in RRC Idle/Inactive state. Alternatively, the UE is allowed to request SIB including TRS/CSI-RS configurations for Idle/Inactive UE in case it is estimated to still remain at least X seconds in RRC Idle/Inactive state.

Figure 5:
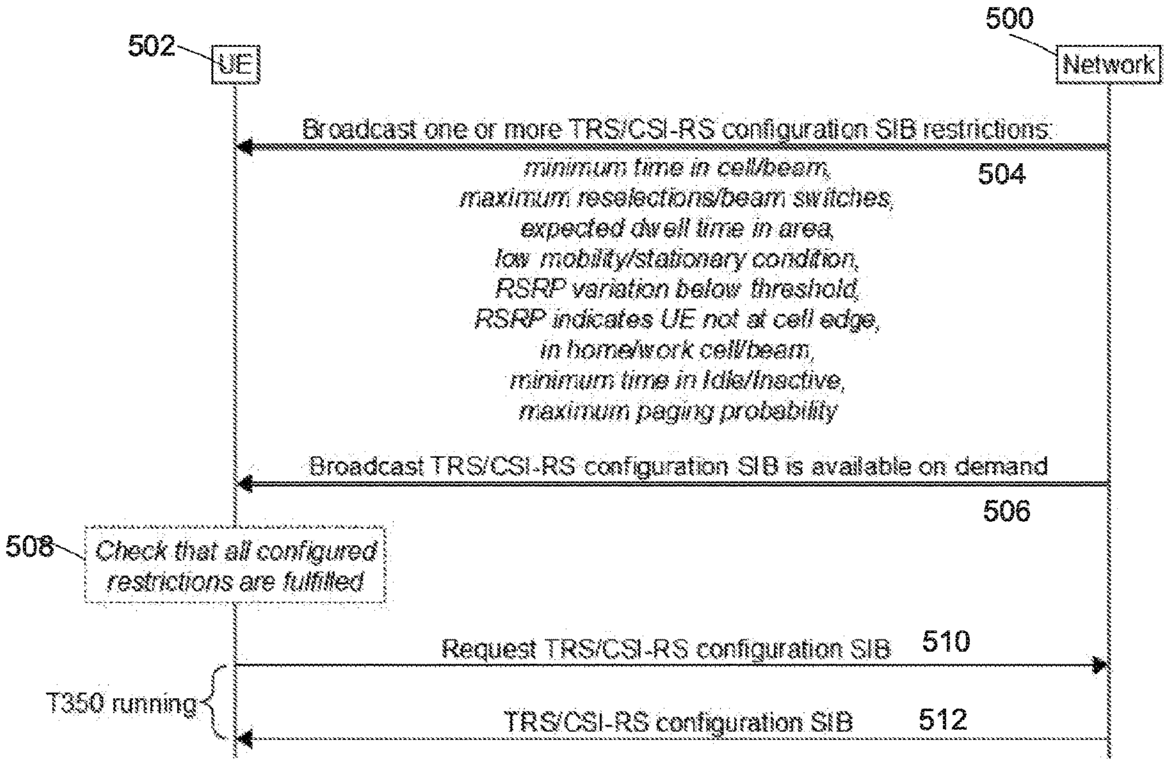
FIG. 5 shows a signaling chart for limiting on-demand SIB requests according to some embodiments.

The implementation of at least some of the embodiments may be illustrated by the signaling chart of FIG. 5. The network element (500), such as an eNB or a gNB, may optionally, according to one embodiment, send (504) the one or more restrictions to the UE (502), said restrictions limiting the UE to send on-demand SIB requests regarding TRS/CSI-RS configurations for RRC Idle/Inactive UE. However, according to another embodiment, said one or more restrictions may already be stored in the UE, for example as defined by a standard.

The network element (500) may also optionally send (506) an indication to the UE (502) that TRS/CSI-RS configurations for RRC Idle/Inactive UE may be obtained by sending an on-demand SIB request. It is noted that the UE may also be aware of the possibility for obtaining the TRS/CSI-RS configurations for RRC Idle/Inactive UE by sending an on-demand SIB request, for example as being a standard-compliant procedure, wherein said indication from the network element is not needed.

The above transmissions from the network element may be carried out as broadcast transmissions to all UEs attached in the cell(s)/beam(s).

The UE checks (508) whether said one or more restrictions are fulfilled, and if affirmative, the UE sends (510) an on-demand SIB request for TRS/CSI-RS configurations for RRC Idle/Inactive UE to the network and starts the timer T350. The network element sends (512) the SIB including the TRS/CSI-RS configurations, wherein upon receiving said SIB, the UE stops the timer T350.

The method and the embodiments related thereto may be implemented in an apparatus implementing a user equipment (UE). The apparatus may comprise at least one processor and at least one memory, said at least one memory stored with computer program code thereon, the at least one memory and the computer program code configured to, with the at least one processor, cause the apparatus at least to perform: store one or more restrictions, in addition to a timer, for limiting the UE to send on-demand System Information Block (SIB) requests regarding Tracking Reference Signal/Channel State Information Reference Signal (TRS/CSI-RS) configurations for Radio Resource Control (RRC) Idle/Inactive UE mode; check that said one or more restrictions are fulfilled; send an on-demand SIB request regarding TRS/CSI-RS configurations for RRC Idle/Inactive UE mode to a network element; and receive a TRS/CSI-RS configuration SIB from the network element.

Such an apparatus may likewise comprise: means for storing one or more restrictions, in addition to a timer, for limiting the UE to send on-demand System Information Block (SIB) requests regarding Tracking Reference Signal/Channel State Information Reference Signal (TRS/CSI-RS) configurations for Radio Resource Control (RRC) Idle/Inactive UE mode; means for checking that said one or more restrictions are fulfilled; means for sending an on-demand SIB request regarding TRS/CSI-RS configurations for RRC Idle/Inactive UE mode to a network element; and means for receiving a TRS/CSI-RS configuration SIB from the network element.

The method and the embodiments related thereto may also be implemented in an apparatus implementing an access point or a base station of a radio access network, such as an eNB or a gNB. An apparatus, such as a gNB, according to an aspect comprises means for receiving an on-demand System Information Block (SIB) request regarding Tracking Reference Signal/Channel State Information Reference Signal (TRS/CSI-RS) configurations from a user equipment (UE) in Radio Resource Control (RRC) Idle/Inactive mode; and means for sending TRS/CSI-RS configuration SIB to the UE in response to affirming that the UE has been provided with one or more restrictions, in addition to a timer, for limiting the UE to send on-demand SIB requests regarding TRS/CSI-RS configurations for RRC Idle/Inactive UE.

An apparatus, such as an access point or a base station of a radio access network, e.g. an eNB or a gNB, according to a further aspect comprises at least one processor and at least one memory, said at least one memory stored with computer program code thereon, the at least one memory and the computer program code configured to, with the at least one processor, cause the apparatus at least to perform: receive an on-demand System Information Block (SIB) request regarding Tracking Reference Signal/Channel State Information Reference Signal (TRS/CSI-RS) configurations from a user equipment (UE) in Radio Resource Control (RRC) Idle/Inactive UE mode; and send TRS/CSI-RS configuration SIB to the UE in response to affirming that the UE has been provided with one or more restrictions, in addition to a timer, for limiting the UE to send on-demand SIB requests regarding TRS/CSI-RS configurations for RRC Idle/Inactive UE.

Such apparatuses may comprise e.g. the functional units disclosed in any of the FIGS. 1-3 for implementing the embodiments.

A further aspect relates to a computer program product, stored on a non-transitory memory medium, comprising computer program code, which when executed by at least one processor, causes an apparatus at least to perform the above operations.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising:

a processor;

a non-transitory computer-readable medium comprising computer-executable instructions that, when executed by the processor, cause the processor to perform the following operations:

receiving restrictions limiting the apparatus to send on-demand system information block (SIB) requests regarding tracking reference signal and channel state information reference signal (TRS/CSI-RS) configurations for radio resource control (RRC) Idle or Inactive mode, wherein if all of the restrictions are not fulfilled, the apparatus is prohibited from sending the request for on-demand SIBs regarding TRS/CSI-RS configurations for RRC Idle or Inactive mode, and wherein the restrictions comprise the following: a threshold time for the apparatus to be associated with at least one cell or beam before allowing to send an on-demand SIB request, the threshold time for the apparatus comprising a dynamically changing group of beams to be attached to, the group of beams being used for cell measurement operations, and wherein the threshold time is associated with at least one unchanged beam; a maximum number of cell reselections or beam switches within a predetermined period for being allowed to send the on-demand SIB request; a minimum time for the apparatus estimated to remain associated with the at least one cell or beam; a maximum threshold value for a mobility of the apparatus, wherein the maximum threshold value for the mobility of the apparatus being defined based on a mobility state of the apparatus; a maximum variation in reference signal received power (RSRP) value;

receiving a timer that prohibits the apparatus from sending the SIB requests regarding the TRS/CSI-RS configurations for RRC Idle or Inactive mode while the timer is running;

storing the restrictions and the timer in the non-transitory computer-readable medium;

determining that all of the restrictions are satisfied;

based on determining that all of the restrictions are satisfied, sending an on-demand SIB request regarding TRS/CSI-RS configurations for RRC Idle or Inactive mode to a network element;

upon sending the SIB request regarding TRS/CSI-RS configurations for RRC Idle or Inactive mode to the network element, starting the timer, upon receiving, from the network element, a reference signal configuration SIB, stopping the timer; and upon stopping the timer, transferring the apparatus from RRC Idle or inactive mode to RRC connected mode.

2. The apparatus according to claim 1, wherein the restrictions further comprise a predetermined location information for the apparatus.

3. The apparatus according to claim 2, wherein the restrictions further comprise a threshold value for a probability of the apparatus being paged.

4. The apparatus according to claim 3, wherein the restrictions further comprise a minimum time for the apparatus having been in RRC Idle or Inactive state or an estimate to remain in RRC Idle or Inactive state.

5. The apparatus according to claim 4, wherein the apparatus is a user equipment.

6. The apparatus according to claim 5, wherein the network element is a base station.

7. The apparatus according to claim 1, wherein the apparatus returns to the RRC idle or inactive mode, and wherein the computer-readable medium further cause the processor to perform the following:

determining that all of the restrictions are satisfied;

based on determining that all of the restrictions are satisfied, sending a second on-demand SIB request regarding TRS/CSI-RS configurations for RRC Idle or Inactive mode to the network element;

upon sending the second SIB request regarding TRS/CSI-RS configurations for RRC Idle or Inactive mode to the network element, starting the timer;

determining that the timer has expired;

based on the timer expiring, determining that all of the restrictions are satisfied;

based on all of the restrictions being satisfied, re-sending the second SIB request regarding TRS/CSI-RS configurations for RRC Idle or Inactive mode to the network element, and re-starting the timer upon receiving, from the network element, a reference signal configuration SIB, stopping the timer; and upon stopping the timer, transferring the apparatus from RRC Idle or inactive mode to RRC connected mode.

8. A system comprising:

a network element;

a user equipment comprising:

a processor; and a non-transitory computer-readable medium comprising computer-executable instructions that, when executed by the processor, cause the processor to perform the following operations:

receiving restrictions limiting the user equipment to send on-demand system information block (SIB) requests regarding tracking reference signal and channel state information reference signal (TRS/CSI-RS) configurations for radio resource control (RRC) Idle or Inactive mode, wherein if all of the restrictions are not fulfilled, the user equipment is prohibited from sending the request for on-demand SIBs regarding TRS/CSI-RS configurations for RRC Idle or Inactive mode, and wherein the restrictions comprise the following: a threshold time for the user equipment to be associated with at least one cell or beam before allowing to send an on-demand SIB request, the threshold time for the user equipment comprising a dynamically changing group of beams to be attached to, the group of beams being used for cell measurement operations, and wherein the threshold time is associated with at least one unchanged beam; a maximum number of cell reselections or beam switches within a predetermined period for being allowed to send the on-demand SIB request; a minimum time for the user equipment estimated to remain associated with the at least one cell or beam; a maximum threshold value for a mobility of the user equipment, wherein the maximum threshold value for the mobility of the user equipment being defined based on a mobility state of the user equipment; a maximum variation in reference signal received power (RSRP) value;

receiving a timer that prohibits the user equipment from sending the SIB requests regarding the TRS/CSI-RS configurations for RRC Idle or Inactive mode while the timer is running;

storing the restrictions and the timer in the non-transitory computer-readable medium;

determining that all of the restrictions are satisfied;

based on determining that all of the restrictions are satisfied, sending an on-demand SIB request regarding TRS/CSI-RS configurations for RRC Idle or Inactive mode to a network element;

upon sending the SIB request regarding TRS/CSI-RS configurations for RRC Idle or Inactive mode to the network element, starting the timer, upon receiving, from the network element, a reference signal configuration SIB, stopping the timer; and upon stopping the timer, transferring the user equipment from RRC Idle or inactive mode to RRC connected mode.

9. The system according to claim 8, wherein the restrictions further comprise a predetermined location information for the user equipment.

10. The system according to claim 9, wherein the restrictions further comprise a threshold value for a probability of the user equipment being paged.

11. The system according to claim 10, wherein the restrictions further comprise a minimum time for the user equipment having been in RRC Idle or Inactive state or an estimate to remain in RRC Idle or Inactive state.

12. The system according to claim 11, wherein the user equipment is a user equipment.

13. The system according to claim 12, wherein the network element is a base station.

14. The system according to claim 13, wherein the user equipment returns to the RRC idle or inactive mode, and wherein the computer-readable medium further cause the processor to perform the following:

determining that all of the restrictions are satisfied;

based on determining that all of the restrictions are satisfied, sending a second on-demand SIB request regarding TRS/CSI-RS configurations for RRC Idle or Inactive mode to the network element;

upon sending the second SIB request regarding TRS/CSI-RS configurations for RRC Idle or Inactive mode to the network element, starting the timer;

determining that the timer has expired;

based on the timer expiring, determining that all of the restrictions are satisfied;

based on all of the restrictions being satisfied, re-sending the second SIB request regarding TRS/CSI-RS configurations for RRC Idle or Inactive mode to the network element, and re-starting the timer upon receiving, from the network element, a reference signal configuration SIB, stopping the timer; and upon stopping the timer, transferring the user equipment from RRC Idle or inactive mode to RRC connected mode.

15. A method comprising:

receiving restrictions limiting a user equipment to send on-demand system information block (SIB) requests regarding tracking reference signal and channel state information reference signal (TRS/CSI-RS) configurations for radio resource control (RRC) Idle or Inactive mode, wherein if all of the restrictions are not fulfilled, the user equipment is prohibited from sending the request for on-demand SIBs regarding TRS/CSI-RS configurations for RRC Idle or Inactive mode, and wherein the restrictions comprise the following: a threshold time for the user equipment to be associated with at least one cell or beam before allowing to send an on-demand SIB request, the threshold time for the user equipment comprising a dynamically changing group of beams to be attached to, the group of beams being used for cell measurement operations, and wherein the threshold time is associated with at least one unchanged beam; a maximum number of cell reselections or beam switches within a predetermined period for being allowed to send the on-demand SIB request; a minimum time for the user equipment estimated to remain associated with the at least one cell or beam; a maximum threshold value for a mobility of the user equipment, wherein the maximum threshold value for the mobility of the user equipment being defined based on a mobility state of the user equipment; a maximum variation in reference signal received power (RSRP) value;

receiving a timer that prohibits the user equipment from sending the SIB requests regarding the TRS/CSI-RS configurations for RRC Idle or Inactive mode while the timer is running;

storing the restrictions and the timer;

determining that all of the restrictions are satisfied;

based on determining that all of the restrictions are satisfied, sending an on-demand SIB request regarding TRS/CSI-RS configurations for RRC Idle or Inactive mode to a network element;

upon sending the SIB request regarding TRS/CSI-RS configurations for RRC Idle or Inactive mode to the network element, starting the timer, upon receiving, from the network element, a reference signal configuration SIB, stopping the timer; and upon stopping the timer, transferring the user equipment from RRC Idle or inactive mode to RRC connected mode.

16. The method according to claim 15, wherein the restrictions further comprise a predetermined location information for the user equipment.

17. The method according to claim 16, wherein the restrictions further comprise a threshold value for a probability of the user equipment being paged.

18. The method according to claim 17, wherein the restrictions further comprise a minimum time for the user equipment having been in RRC Idle or Inactive state or an estimate to remain in RRC Idle or Inactive state.

19. The method according to claim 18, wherein the user equipment is a user equipment, and wherein the network element is a base station.

20. The method according to claim 19, wherein the user equipment returns to the RRC idle or inactive mode, and wherein the method further comprises:

determining that all of the restrictions are satisfied;

based on determining that all of the restrictions are satisfied, sending a second on-demand SIB request regarding TRS/CSI-RS configurations for RRC Idle or Inactive mode to the network element;

upon sending the second SIB request regarding TRS/CSI-RS configurations for RRC Idle or Inactive mode to the network element, starting the timer;

determining that the timer has expired;

based on the timer expiring, determining that all of the restrictions are satisfied;

based on all of the restrictions being satisfied, re-sending the second SIB request regarding TRS/CSI-RS configurations for RRC Idle or Inactive mode to the network element, and re-starting the timer upon receiving, from the network element, a reference signal configuration SIB, stopping the timer; and upon stopping the timer, transferring the user equipment from RRC Idle or inactive mode to RRC connected mode.

* * * * *